Jan. 16, 1951  A. B. WELTY, JR  2,538,219
COAL GASIFICATION
Filed Sept. 27, 1946
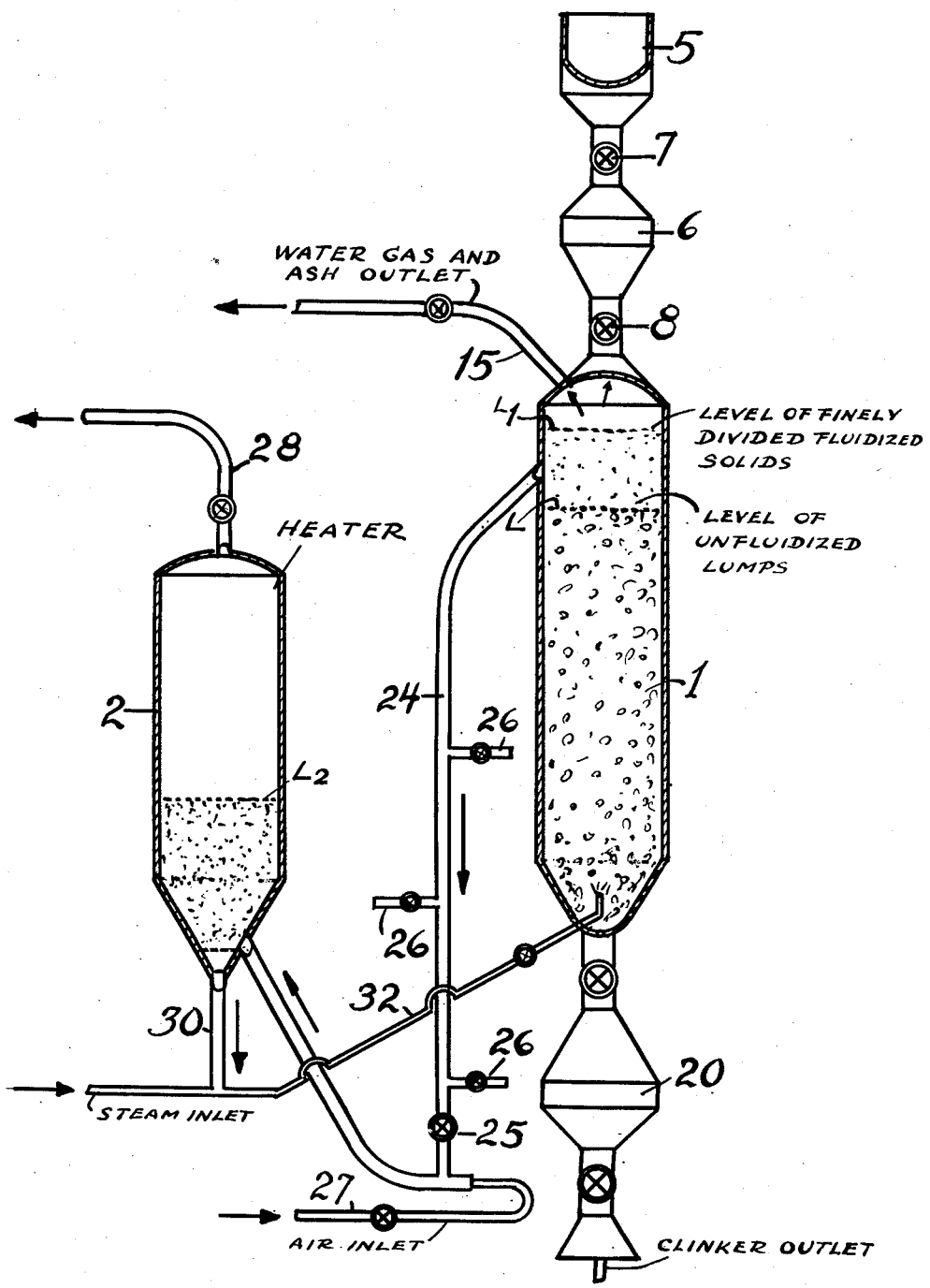
Albert B. Welty, Jr. Inventor
By P. J. Whelan Attorney Patented Jan. 16, 1951

2,538,219

UNITED STATES PATENT OFFICE 2,538,219

COAL GASIFICATION

Albert B. Welty, Jr., Mountainside, N. J., assignor to Standard Oil Development Company, a corporation of Delaware Application September 27, 1946, Serial No. 699,656

27 Claims. (Cl. 48—206)

The present invention relates generally to improvements in the synthesis of hydrocarbons from the oxides of carbon and hydrogen; and, in particular, it relates to improvements in preparing a suitable mixture of carbon monoxide and hydrogen.

Petroleum technologists and others are familiar with the so-called fluidized solid technique as a very important recent improvement in the chemical arts wherein a powdered solid is contacted with a gasiform material in a reaction zone. For example, there are now in existence a number of commercial cracking units employing this type of technique. As is known to those familiar with the art, the catalyst in the form of a powder is suspended in the reaction zone in the form of a dense, turbulent, ebullient suspension and the reactants are forced through this dense suspension in the reaction zone, entering at a point near the bottom and being removed at a point near the top thereof. If the occasion requires it—as, of course, it does in catalytic cracking—the catalyst may be withdrawn overhead with the reactants and separated by causing the suspension to flow through one or more solid-gas contacting devices to separate the catalyst, which catalyst is then conducted to a regeneration zone where again it is maintained in the form of a dense, turbulent suspension and treated with an oxygen-containing gas to remove by combustion contaminants thereon, whereupon the catalyst is returned to the reaction zone for further use in the process. In a more recent modification of this type of operation in the catalytic cracking field, the catalyst is withdrawn from the side or bottom of the reactor and then conducted to the regeneration zone.

As previously indicated, my present process relates generally to the hydrocarbon synthesis process but, in particular, to a process for gasifying a carbonaceous material, such as coal, in order to produce commercial mixtures of carbon monoxide and hydrogen. It should be pointed out, of course, that the carbon monoxide and hydrogen thus produced could be used as a fuel to synthesize methanol or for many other purposes other than as a feed gas to hydrocarbon synthesis operation. However, I shall illustrate my process by referring to a method of preparing a suitable mixture of carbon monoxide and hydrogen which could be used as feed gas in a hydrocarbon synthesis operation.

In the production of water gas from coal or coke, using the fluidized solids technique, wherein heat is generated in one vessel to which air is introduced and water gas is generated in another vessel where steam is introduced, one important problem is that of minimizing the formation of CO in the heater. This is important because to the extent that CO is formed instead of $CO_2$ much more air and coke are required for heating purposes. This is illustrated by the equations given below:

Heat of reaction at 1800° F.
B. t. u. per pound mol of carbon

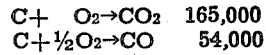

$$C + O_2 \rightarrow CO_2 \quad 165{,}000$$
$$C + \tfrac{1}{2}O_2 \rightarrow CO \quad 54{,}000$$

The additional amount of air required for a given heat release when forming CO instead of $CO_2$ will carry with it a considerable amount of heat so that the differential in useful heat release is even greater than that suggested by the heats of reaction indicated above.

If equilibrium were allowed to establish itself in the presence of the coal or coke bed, very little $CO_2$ would be present in the exit gas. However, because the reaction to form $CO_2$ is much more rapid than the apparently subsequent reaction of carbon and $CO_2$ to form CO, this formation of CO in the heater is minimized by maintaining the coke concentration in the bed of inert material in the heater at a very low concentration, thus minimizing the opportunity for reaction. This, however, means that the carbon content of the inert solids circulated to the water gas generator will also be at a low level and, therefore, it is difficult to realize as great steam utilization as is desired.

One method by which this is accomplished, which is the crux of this invention, is to add to the water gas generator coal or coke in a size sufficiently great that it will not be fluidized under the conditions to be used in the water gas generator. Non-fluidizable ash would be removed continually from the bottom of the water gas generator. There is thus provided, in effect, a moving solids bed of coal or coke through which a much finer relatively inert heat-carrying solid is circulated. This circulating solid is the same as that being circulated between the water gas generator and heater.

In the accompanying drawing, I have shown diagrammatically one form of apparatus in which a preferred modification of my invention may be carried into effect.

Referring in detail to the drawing, 1 represents the water gas generator and 2, a heater. Lumps of coal or coke are charged to the water gas generator from feed hopper 5 through the lock hopper 6, the coal or coke passing through large valves 7 and 8. These lumps of carbonaceous material will be mostly ½ inch mesh and larger, so that they will not be "fluidized" in the ordinary sense of the word but will be in the form of a rather loosely compacted bed in the said water gas generator. A smaller amount of finely divided carbonaceous material which is fluidizable is included in the feed as well in order to provide some of the carbon for the heater vessel. Between the lumps of carbonaceous material, such as coal, in the water gas generator there will be a fluidized solid which will include the finer coal charged, the finer ash from the coal, small pieces of coal partly consumed or broken from the larger pieces charged and may include as well a foreign finely divided material. This foreign material will in general be heavier than the ash, and carbon so that it will not be elutriated from the vessel and should be such as not to have the effect of reducing the ash fusion point. Finely divided sand is a suitable material. To this end, therefore, the powdered inert solid having a particle size of, say, from 20 to 400 microns is introduced with steam into the water gas generator through a line 32. The steam which enters the bottom of the generator flows upwardly through the bed of lumps and fines of carbonaceous material, such as coal. The lump material will have an upper level at L. The sand and coal fines pass through the interstices of the lump coal with the steam and form a supernatant layer of fluidized sand and coal fines having an upper level at $L_1$. During the passage of the steam through the mass of carbonaceous material, a reaction takes place in which hydrogen and carbon monoxide are formed according to the well known water gas reaction. A small amount of $CO_2$ and traces of methane and other "impurities" are found in the exit gas as well. As is usually the case, in the upper portion of the water gas generator there is disposed one or more, preferably several, solids-gas contacting devices commonly known as "cyclones" (not shown), through which the emerging product is forced for the purpose of separating out entrained fines. The product which is withdrawn through line 15 may contain some ash in a finely powdered form; this is removed by water scrubbers before collecting the product in equipment not shown. The gasification of the carbonaceous material results in the formation of a clinker. This clinker can be withdrawn from the bottom of the regenerator through lock hopper 20. The conical base of generator 1 is so sized relative to the upward steam velocity as to keep the fluidized solids (e. g., the sand, the coal fines and the ash) out of the said base, thus preventing their removal with the clinker. The velocity in the water gas generator above the cone is such, however, as to allow free circulation of the fluidized solids phase throughout the mass of lump coal, thus supplying heat to the coal, which is undergoing the endothermic water gas reaction.

The inert powdered solid material admixed with a low concentration of coal fines is withdrawn from the generator and caused to flow downwardly in a standpipe 24 controlled by a suitable valve 25, and provided with a number of gas taps 26 into which a small quantity of air or other gas may be introduced for the purpose of increasing the fluidity of the downflowing solids. The solids are discharged into an air stream in line 27 and then conveyed pneumatically to the heater 2 where they are formed into a dense, ebullient fluidized mass of solids in air and wherein the coal fines and other carbonaceous material are consumed by combustion. The combustion fumes, withdrawn overhead through line 28, consist for the most part of CO, $CO_2$, $N_2$, and a small amount of unconverted $O_2$. The concentration of carbon in the inert solids in this vessel and the air flow rate and temperature are so adjusted as to minimize CO formation and maximize $CO_2$ formation and oxygen consumption since under these conditions most heat is released. The carbon concentration will ordinarily be 0.02 to 0.2 weight per cent of the total solids in the vessel at any given time. Air velocity is such as to avoid excessive solids entrainment overhead and may be 0.2 to 3.0 feet per second superficial velocity. The bed should be as shallow as practical, i. e., 3 to 15 feet, and temperature should be 100 to 200° F. higher than in the water gas generator, say, 1700 to 2200° F. The dense suspension will have an upper level at $L_2$, as indicated in the drawing. The highly heated solids are withdrawn from the heater 2 through line 30 controlled by a suitable valve located at near the bottom thereof (not shown) and discharged into a steam line 32 to form a suspension therein; thereafter, the suspension of solids 32 is conveyed into the generator 1, where the said solids pass upwardly through the lumps of carbonaceous material, releasing their heat thereto and maintaining the desired temperature in the water gas generator.

I now set forth below a specific example illustrating my invention, as follows:

| | Heater Vessel | Water Gas Vessel |
|---|---|---|
| Gas in | Air | Steam |
| Linear velocity of entering gas, ft./sec.[1] | 1.0 | 0.5 |
| Temperature, °F | 1,950 | 1,800 |
| Height of bed in vessel, ft | 15 | 60 |
| Pressure, lbs./sq. in. gauge | 5 | 5 |
| General Conditions: | | |
| Carbon concentration in circulating stream of fluidized solids—weight per cent | 0.1 | |
| Fluidized solids circulation rate between vessels—lbs./lb. carbon burned | 150–200 | |
| Coal fed (particle size): | | |
| Finer than 100 mesh....weight per cent | 5 | |
| 100 to 10 mesh....do | 15 | |
| 10 to 2 mesh....do | 30 | |
| 2 mesh and larger....do | 50 | |

[1] Depending on the circulating solid (e. g., sand) these velocities may vary from 0.4 to 4–5 feet per second.

In the foregoing example the residence time of the $CO_2$ formed is sufficiently low in the heating zone so that the reduction of the $CO_2$ by carbon to CO is greatly minimized and, as a result, the fumes issuing from the heating zone contain from 15 to 20 volumes of $CO_2$ per volume of CO.

To recapitulate briefly, my present invention relates to a method of preparing commercial mixtures of carbon monoxide and hydrogen by the utilization of coal, coke, or other carbonaceous material of such size that a major portion thereof is not fluidized under the conditions used in a water gas generator where it is treated with steam but rather descends through said zone, against an upflowing foreign material in powdered form. There is, however, a minor quantity of added and formed carbonaceous fines. This foreign material in the water gas generator is a fluidizable, inert solid which circulates continuously between the water gas generator and a heater or combustion zone, the inert material being admixed with carbonaceous fines from the water gas generator as it passes to the heater, which fines in low concentration are burned in the heater or combustion zone with air (or oxygen) to generate heat by the formation of $CO_2$, conditions being adjusted so as to maximize oxygen consumption and minimize CO formation. The foreign material thus heated is returned to the generator. In the description and the drawing which embody the present specification, I have described and illustrated a process in which it is possible to minimize CO formation in the heater while at the same time obtaining high steam utilization in the water gas generator. This, as stated, has the desirable result of obtaining the maximum quantity of heat from the carbon which is burned to supply heat to support the water gas reaction in the generator known to be, of course, highly endothermic.

Numerous modifications of my invention falling within the scope thereof may be made by those who are familiar with this art.

What is claimed is:

1. A method of converting solid carbonaceous material into a commercial mixture containing CO and $H_2$, which comprises continuously supplying to a water gas generation zone a supply of carbonaceous particles and essentially inert particles of different sizes, said inert particles being of a fluidizable size such that they will be suspended in an upwardly flowing stream of steam, while said carbonaceous particles are predominantly of a non-fluidizable size such that they will gravitate downwardly as a loosely compacted moving bed countercurrent to said stream, maintaining in said zone a temperature sufficiently high to support a reaction of the steam with said carbonaceous particles to form CO and $H_2$, passing steam upwardly through the downwardly moving bed, at a velocity sufficient to entrain said inert particles and carbonaceous fines present in said bed, and to form a dense phase of carbonaceous fines and inert particles above said bed, the dense phase being separated by an interface from a superimposed dilute phase of these materials, withdrawing inert particles and carbonaceous fines from said dense phase and conducting them with added air to a heating zone, the quantity of inert particles being in large excess over the quantity of carbonaceous fines, burning some of said carbonaceous fines with said air in said heating zone whereby said inert particles are heated and returning inert particles thus heated to the water gas generation zone at a lower point thereof.

2. The method set forth in claim 1 in which the carbon concentration in the stream passing to the heating zone is about one-tenth weight per cent of the total inert material and carbonaceous fines.

3. The method set forth in claim 1 in which the circulation rate of the inert material between the water gas generation zone and the heating zone is from 100 to 200 pounds per pound of carbon burned.

4. The method set forth in claim 1 in which the carbonaceous material in the water gas generation zone contains up to about 45 per cent fines having a particle size not exceeding 100 mesh.

5. The method set forth in claim 1 in which the operating conditions in said heating zone are so controlled that the residence time of the $CO_2$ formed in the heating zone is sufficiently short so that the combustion fumes contain from 15 to 20 volumes of $CO_2$ per volume of CO.

6. The method set forth in claim 1 in which the superficial velocity of the gas entering the water gas reaction zone is from 0.4 to 5 feet per second.

7. The method set forth in claim 1 in which the solids containing carbonaceous material are resident in the reaction zone for a period of time not exceeding about 15 seconds.

8. The method set forth in claim 1 in which said inert particles are sand.

9. The method set forth in claim 1 in which the inert material circulating to and fro between the water gas generation zone and the heating zone is finely divided sand.

10. The method of gasifying solid carbonaceous material, which comprises continuously supplying to a water gas generation zone a supply of subdivided carbonaceous material and essentially inert material of different particle sizes, said inert material being of such particle size that it will be suspended in an upwardly flowing stream of steam, while said carbonaceous material is predominantly of such particle size that it will gravitate downwardly as a moving bed countercurrent to said stream, passing said inert material upwardly through said bed together with steam, maintaining a temperature in said zone sufficiently high to support a reaction of the steam with the carbonaceous material to form a gaseous product containing CO and $H_2$, passing the carbonaceous material downwardly in said zone, withdrawing the inert material and admixed carbonaceous material from an upper point in said zone, conducting the mixture to a heating zone, passing air upwardly in contact with said inert material in said heating zone at a velocity adequate to cause separation of said inert material into dense and dilute phases separated by an interface in said heating zone, and thereafter returning inert material heated in said heating zone to a point near the bottom of said gas generation zone.

11. The method set forth in claim 10 in which the powdered inert material circulating between the gas generation and heating zones is sand.

12. The method set forth in claim 10 in which the finely divided inert material remains resident in the heating zone for a period of time not exceeding about 15 seconds.

13. The method set forth in claim 10 in which the operating conditions in said heating zone are so controlled that the fumes issuing from the heater contain from 15 to 20 volumes of $CO_2$ per volume of CO.

14. A method of converting solid carbonaceous material into a commercial mixture containing CO and $H_2$ which comprises continuously supplying to a water gas generation zone a supply of a carbonaceous material and an essentially inert material of different particle sizes, said inert material having a fluidizable particle size such that it will be suspended in an upwardly flowing stream of steam, while said carbonaceous material is predominantly of such particle size that it will gravitate downwardly as a moving bed countercurrent to said stream, maintaining in said zone temperatures sufficiently high to support a reaction of the steam with the carbonaceous material to form CO and $H_2$, passing steam upwardly through the downwardly moving bed at a velocity sufficient to entrain inert material and carbonaceous fines present in said bed, and to form a dense phase of carbonaceous fines and inert material above said bed, the dense phase being separated by an interface from a superimposed dilute phase of these materials, withdrawing the inert material and carbonaceous fines from said dense phase and conducting them with added air to a heating zone, the quantity of inert material being in large excess over the quantity of carbonaceous fines, burning some of said carbonaceous fines in said heating zone whereby the said inert material is heated, controlling the operating conditions in said heating zone so that the formed carbon dioxide remains resident in the heating zone for a period of time insufficient to cause substantial reduction thereof, and returning the thus heated inert material to the water gas generation zone at a lower point thereof.

15. The method set forth in claim 14 in which the carbon concentration in the stream passing to the heating zone is about one-tenth weight per cent of the total inert material and carbonaceous fines.

16. The method set forth in claim 14 in which the circulation rate of the inert material between the water gas generation zone and the heating zone is from 100 to 200 pounds per pound of carbon burned.

17. The method set forth in claim 14 in which the carbonaceous material in the water gas generation zone contains up to about 45 per cent fines having a particle size not exceeding 100 mesh.

18. The method set forth in claim 14 in which the operating conditions in said heating zone are so controlled that the residence time of the $CO_2$ formed in the heating zone is sufficiently short so that the combustion fumes contain from 15 to 20 volumes of $CO_2$ per volume of CO.

19. The method set forth in claim 14 in which the superficial velocity of the gas entering the water gas generation zone is from 0.4 to 5 feet per second.

20. The method set forth in claim 14 in which the solids containing carbonaceous material are resident in the gas generation zone for a period of time not exceeding about 15 seconds.

21. The method set forth in claim 14 in which said inert material is sand.

22. The method set forth in claim 14 in which the inert material circulating to and fro between the water gas generation and heating zones is finely divided sand.

23. The method of gasifying solid carbonaceous material which comprises continuousy supplying to a water gas generation zone a supply of subdivided carbonaceous material and essentially inert material of different particle sizes, said inert material being of such particle size that it will be suspended in an upwardly flowing stream of steam, while the said carbonaceous material is predominantly of such particle size that it will gravitate downwardlly as a moving bed countercurrent to said stream, passing said inert material upwardly through said bed together with steam, maintaining a temperature in said zone sufficiently high to support a reaction of the steam with the carbonaceous material to form a gaseous product containing CO and $H_2$, passing the carbonaceous material downwardly in said zone, withdrawing the inert material and admixed carbonaceous material from an upper point in said gas generation zone, conducting the mixture to a heating zone, passing air upwardly in contact with said inert material in said heating zone, at a velocity adequate to cause separation of said inert material into dense and dilute phases separated by an interface in said heating zone, controlling the operating conditions in said heating zone so that formed $CO_2$ remains resident in said heating zone for a period of time insufficient to permit substantial reduction of the $CO_2$, whereby the said inert material is heated to a high temperature and thereafter returning said said highly heated inert material to a point near the bottom of said gas generation zone.

24. The method set forth in claim 23 in which the inert material circulating between the gas generation and the heating zones is sand.

25. The method set forth in claim 23 in which the inert material remains resident in the heating zone for a period of time not exceeding about 15 seconds.

26. The method set forth in claim 23 in which the operating conditions in said heating zone are so controlled that the fumes issuing from the heater contain from 15 to 20 volumes of $CO_2$ per volume of CO.

27. A method of converting solid carbonaceous material into a commercial mixture containing CO and $H_2$ which comprises continuously supplying to a water gas generation zone a supply of carbonaceous and essentially inert particles of different sizes, said inert particles being of such size that they will be suspended in an upwardly flowing stream of steam while said carbonaceous particles are predominantly of such size that they will gravitate downwardly as a moving bed countercurrent to said stream, passing said inert material upwardly through said bed together with steam, preheating said inert material prior to its supply to said zone sufficiently high to maintain in said zone a temperature adequate to support a reaction of the steam with said carbonaceous particles to form a gaseous product containing CO and $H_2$, withdrawing inert material and product from an upper portion of said zone and withdrawing spent particles of said gravitating size from a lower portion of said zone.

ALBERT B. WELTY, JR.

No references cited.